United States Patent [19]

Wright

[11] Patent Number: 5,456,653
[45] Date of Patent: Oct. 10, 1995

[54] TORSIONALLY ELASTIC ASSEMBLY FOR DRIVING A CENTRIFUGE ROTOR

[75] Inventor: Herschel E. Wright, Gilroy, Calif.

[73] Assignee: Beckman Instruments, Inc., Fullerton, Calif.

[21] Appl. No.: 271,835

[22] Filed: Jul. 7, 1994

[51] Int. Cl.$^6$ ............................. B04B 9/00; F16D 3/12
[52] U.S. Cl. .................. 494/82; 494/84; 464/51
[58] Field of Search .................... 494/12, 16, 20, 494/82, 84; 464/51, 52, 81, 179

[56] References Cited

U.S. PATENT DOCUMENTS

| | | | |
|---|---|---|---|
| 2,827,229 | 3/1958 | Blum | 494/82 |
| 3,851,819 | 12/1974 | Tadokoro | 233/24 |
| 4,070,290 | 1/1978 | Crosby | 210/91 |
| 4,193,536 | 3/1980 | Kubota | 233/11 |
| 4,205,261 | 5/1980 | Franklin | 318/480 |
| 4,412,831 | 11/1983 | Avery et al. | 494/82 |
| 4,456,581 | 6/1984 | Edelmann et al. | 422/72 |
| 4,586,918 | 5/1986 | Cole | 494/20 |
| 5,342,282 | 8/1994 | Letourneur | 494/82 |

FOREIGN PATENT DOCUMENTS 1432829  4/1969  Germany .................... 494/82

Primary Examiner—David A. Scherbel
Assistant Examiner—Randall E. Chin
Attorney, Agent, or Firm—William H. May; Gary T. Hampson; Terry McHugh

[57] ABSTRACT

A centrifuge includes a drive shaft-to-hub coupling assembly for providing vibration damping that is selective to torsional damping over lateral damping. An impeller is fixed to a drive shaft and a receiver is fixed to a rotor-bearing hub. Relative rotation between the impeller and the receiver is restricted to compression and decompression of elastomers trapped between teeth extending from the impeller and from the receiver. The elastomers function to damp torsional vibrations and torsionally induced lateral vibrations. The receiver is prevented from becoming axially misaligned with the impeller by including one or more rigid annular bushings that maintain the distance between the hub and the drive shaft, thereby preventing the elastomers from being deformed in a manner which would damp lateral vibrations. The annular bushing is mounted to allow relative rotation between the impeller and the receiver.

18 Claims, 2 Drawing Sheets

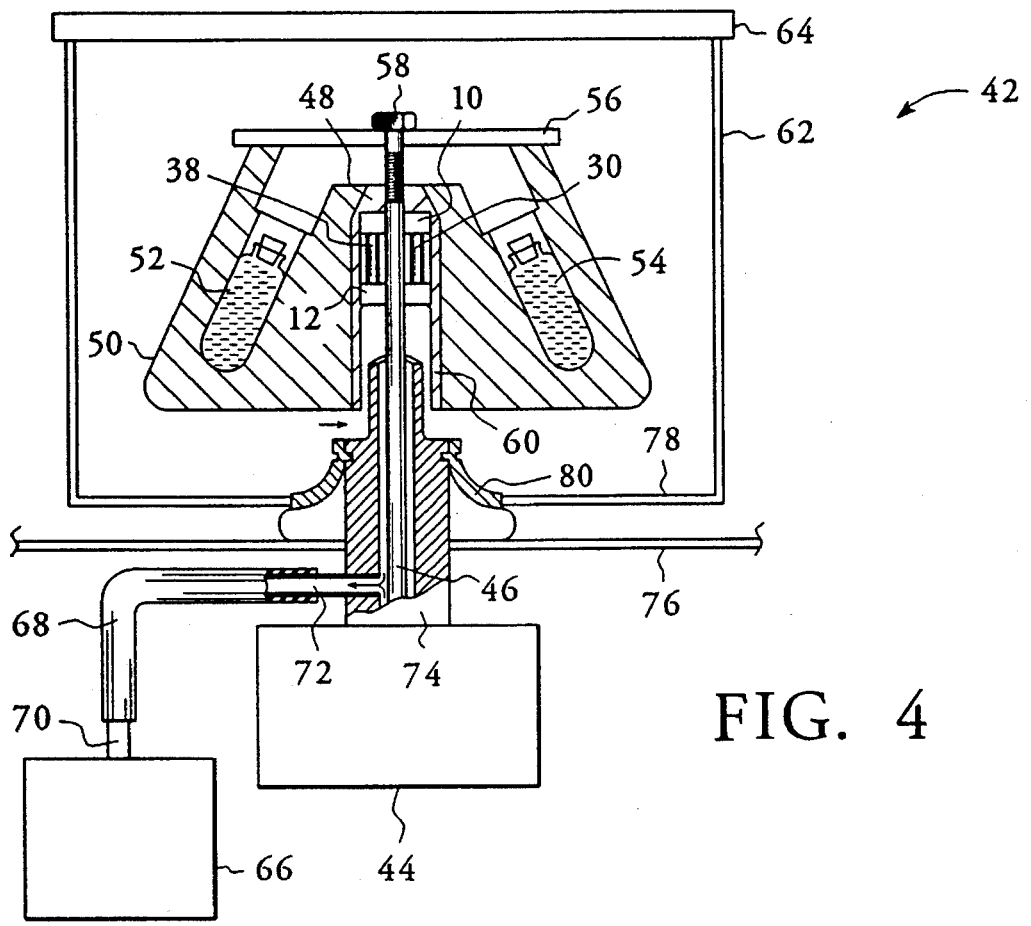
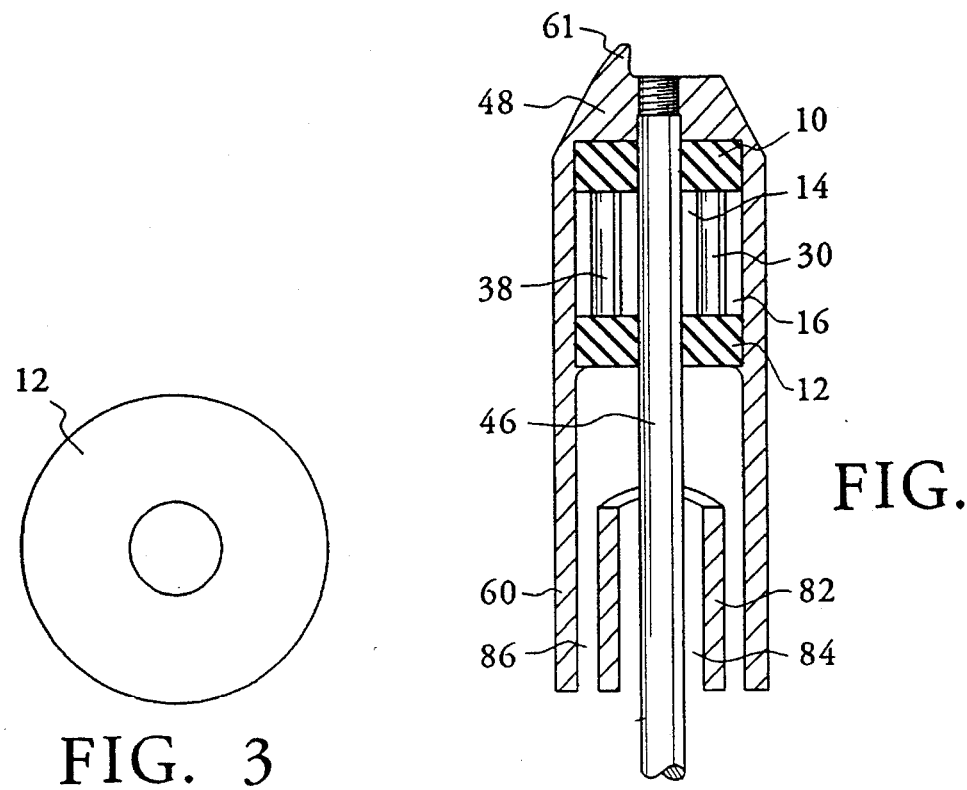
FIG. 4
FIG. 3
FIG. 5

TORSIONALLY ELASTIC ASSEMBLY FOR DRIVING A CENTRIFUGE ROTOR

TECHNICAL FIELD

The present invention relates generally to centrifuges and more particularly to assemblies for transmitting torque from a drive shaft to a centrifuge rotor.

BACKGROUND ART

In the separation of components of a biological or chemical sample, both torsional vibrations and lateral vibrations within the centrifuge can result in equipment failures. Torsional vibrations are also referred to as torque ripple, and are manifested as changes in the angular velocity of a motor armature compared to a sample-containing rotor. Torsional vibrations generate stresses that alone may be sufficient to jeopardize a drive shaft of the centrifuge. However, the torsional vibrations typically induce some lateral vibration, so that the combination of torsional stresses and torsionally induced lateral stresses further reduces the safety factor of the system.

Regarding lateral vibration, at the critical speed of the rotating system of the centrifuge, the rotating system becomes dynamically unstable. As a result, large lateral amplitudes create "whirl," with the sample containing rotor bending the drive shaft. This phenomenon occurs when the angular velocity excites the natural frequency of lateral vibrations. A centrifuge is particularly susceptible to shaft failure when these lateral vibrations are combined with torsional vibrations.

It is known to increase the safety factor of a centrifuge by designing a drive mount that provides both vibration isolation and damping between a drive motor and a frame of the centrifuge. U.S. Pat. No. 4,193,536 to Kubota describes vibration-isolating supports positioned between a mounting plate and a bottom plate, with the drive motor being supported in such a manner as to minimize transmission of the vibration of the motor to an outer frame. The resulting foundation flexibility and damping increases the critical speed, i.e. whirl threshold speed, of the rotary system.

Improvements in damping torsional vibrations can be achieved by various techniques. The design of the coupling assembly of a drive motor to a drive shaft will affect the extent to which torsional stress and torsionally induced lateral stresses are generated during operation of a centrifuge. Thus, damping structure within the motor-to-shaft assembly is common. On the other hand, damping structure is typically not included within the assembly that transmits torque from the drive shaft to the sample-containing rotor. U.S. Pat. No. 4,205,261 to Franklin, which is assigned to the assignee of the present invention, describes the drive shaft as being connected directly to a hub, which is connected directly to the rotor. A difficulty with conventional damping techniques being applied at the shaft-to-rotor transmission assembly is that torsional damping is typically accompanied by damping of lateral vibrations. A key to maintaining the factor of safety for the centrifuge is the maintenance of a ratio of lateral damping at the foundation system to lateral damping at the rotary system. Thus, unless the foundation system is adjusted, torsional damping at the shaft-to-rotor assembly will lead to lateral damping that renders the centrifuge more susceptible to high speed whirl that can cause shaft failure.

It is an object of the present invention to provide an assembly for connecting a drive shaft to a driven rotor-supporting hub, wherein the assembly is selective with respect to damping torsional vibrations.

SUMMARY OF THE INVENTION

The above object has been met by a centrifuge having a drive shaft-to-rotor hub connecting assembly which is selective with respect to damping torsional vibrations by means of torsionally deformable members in the connecting assembly. Damping of torsional vibrations at the hub reduces torsional resonance stresses, but lateral movement between the drive shaft and the hub is substantially prevented, so that lateral vibration damping by the connecting assembly is limited.

In the preferred embodiment, at least one annular bushing is slip fit onto the drive shaft. The outer circumference of each bushing is in contact with the hub. Thus, the hub remains at a fixed distance from the drive shaft and the hub is fixed in a coaxial relationship with the shaft. However, relative rotation between the hub and the drive shaft is necessary, so that the bushings should not be fixed to both the hub and the drive shaft.

Using one or more annular bushings will limit damping of lateral vibrations at the shaft-to-hub interface. Consequently, the lateral damping can be addressed at other structures of the centrifuge. On the other hand, torsional damping is achieved at the shaft-to-hub assembly by use of torsionally deformable cylindrical members. In the preferred embodiment, the deformable members are an array of elastomers distributed symmetrically about the drive shaft.

A first sleeve, or impeller, is fixed to the drive shaft for rotation with the shaft. The first sleeve includes teeth that extend outwardly from the outer circumference of the sleeve. Each tooth separates a first pair of the elastomers from a second pair. A second sleeve, or receiver, is fixed to the hub for rotation with the hub. Inwardly directed teeth separate on the inner circumference of the second sleeve one elastomer in a pair from the other elastomer in the pair. Thus, a tooth of the first sleeve combines with a tooth from the second sleeve to trap a single elastomer. In the preferred embodiment, the elastomers are cylindrical and have axes that are parallel to the axis of the drive shaft.

Rotation of the drive shaft is transmitted to the hub via the elastomers. Torsional vibration causes compression and decompression of the elastomers between the teeth of the first sleeve and the teeth of the second sleeve. The compression and decompression acts to damp the torsional vibration. However, the rigid annular bushings prevent radial compression of the torque-transmitting assembly, thereby limiting the damping of lateral vibrations.

An advantage of the present invention is that destructive torsional vibrations and torsionally induced lateral vibrations are damped without affecting lateral damping. Thus, the invention can be implemented without significantly changing the ratio of lateral damping at a foundation system to lateral damping at a rotary system of a centrifuge.

BRIEF DESCRIPTION OF THE DRAWINGS

FIG. 3 is an end view of an annular bushing of the assembly of FIG. 1.

FIG. 4 is a side sectional view of a centrifuge that includes the assembly of FIG. 1.

FIG. 5 is a side sectional view of the drive shaft and hub of FIG. 4.

BEST MODE FOR CARRYING OUT THE INVENTION

Figure 1:
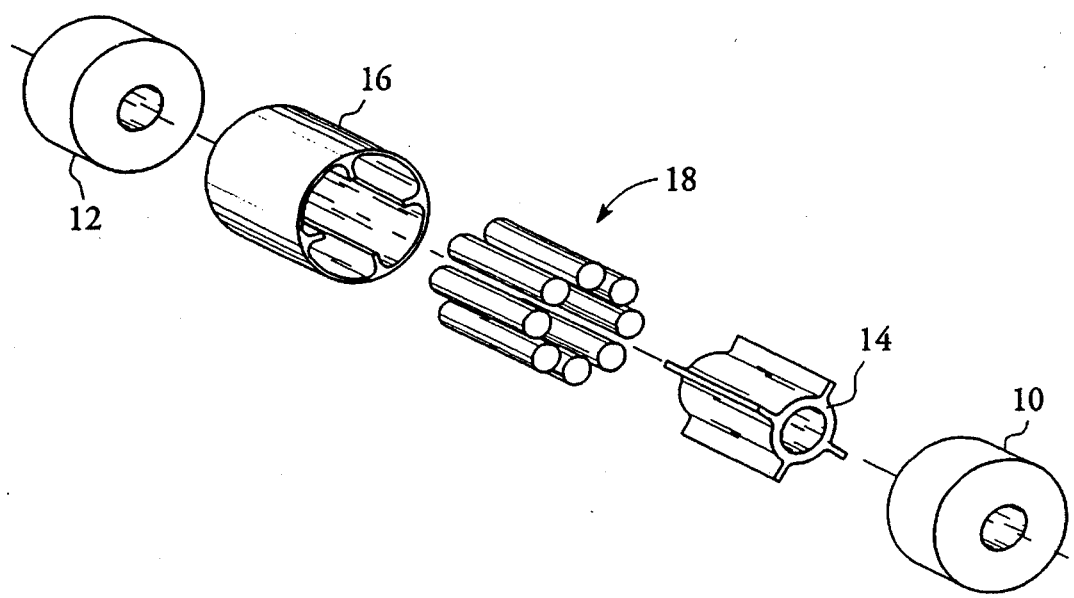
FIG. 1 is an exploded perspective view of a drive shaft-to-hub coupling assembly for selectively damping torsional vibrations in accordance with the present invention.

With reference to FIG. 1, an assembly for the transmission of torque from a drive shaft to a hub of a centrifuge is shown as including first and second bushings 10 and 12, an impeller 14, a receiver 16 and an array 18 of cylindrical elastomers. Two bushings 10 and 12 are shown, but in some embodiments a single bushing is sufficient in providing the desired lateral stiffness as described below.

Figure 2A:
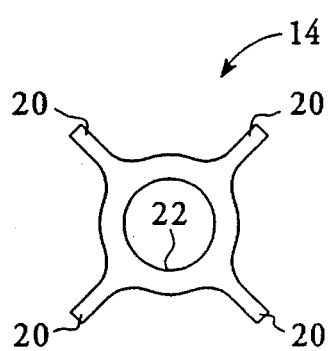
FIG. 2a is an end view of an impeller of the assembly of FIG. 1.
Figure 2B:
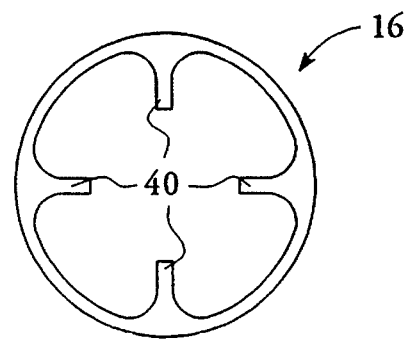
FIG. 2b is an end view of a receiver of the assembly of FIG. 1.
Figure 2C:
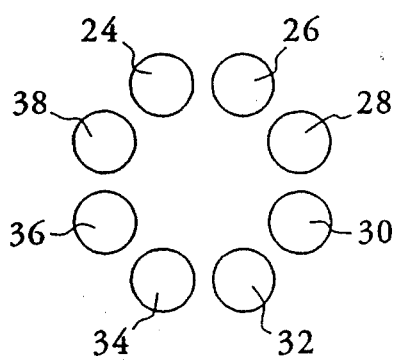
FIG. 2c is an end view of elastomers of the assembly of FIG. 1.
Figure 2D:
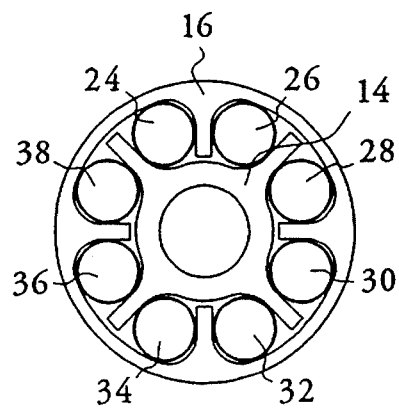
FIG. 2d is an end view of an assembly of the structure of FIGS. 2a–2c.

The impeller 14 is shown in FIGS. 1, 2a and 2d. The impeller is a sleeve having four radially extending teeth 20. The teeth are equidistantly arranged around the outer circumference of the impeller. The inside diameter of the impeller should be only slightly greater than the diameter of the shaft to which the impeller is affixed. In the preferred embodiment, the impeller is press fit to the drive shaft for rotation with the shaft. By way of example, the bore 22 through the axis of the impeller may have a diameter of approximately 7.5 mm. The outside diameter of the impeller may be approximately 12.5 mm, but this is not critical.

When assembled, between each pair of teeth 20 of the impeller 14 is a pair of the elastomers. In FIGS. 2c and 2d, elastomers 24 and 26 form a first pair, elastomers 28 and 30 form a second pair, elastomers 32 and 34 form a third pair, and elastomers 36 and 38 form a fourth pair. In the illustrated embodiment, each elastomer has a diameter of approximately 3.5 mm and a length of approximately 9 mm. However, the dimensions may be changed to optimize performance in different applications of transmitting rotary drive from a drive shaft to a hub of a centrifuge.

Referring now to FIGS. 1, 2b and 2d, the receiver 16 is a radially outward sleeve that has inwardly directed teeth 40. The outside diameter of the receiver should be slightly less than the inside diameter of a hub to which the receiver is to be affixed. As an example, the outside diameter may be approximately 22 mm. The teeth 40 separate the two elastomers 24–38 of each elastomer pair defined by the teeth of the impeller 14. Thus, each elastomer is trapped between a tooth of the impeller 14 and a tooth of the receiver 16. Consequently, relative rotation between the receiver and the impeller is limited by the degree to which the elastomers are compressible. The elastomers are typically in a compressed state even when the assembly of FIG. 2d is stationary, but the elastomers must be capable of further compression.

An acceptable material for forming the elastomers 24–38 is urethane. The impeller 14 and the receiver 16 may be formed of extruded aluminum.

Referring now to FIGS. 1 and 3, the bushings 10 and 12 are rigid annular members. The inside diameter may be approximately 8 mm, but this dimension is dependent upon the diameter of the drive shaft on which the bushings are fitted. In the preferred embodiment, the bushings are slip fit onto the shaft to allow rotation of the bushings relative to the shaft. However, the relative movement is limited by fixing the outside diameter of the bushings to the hub. The outside diameter is approximately 22 mm, the same outside diameter as the receiver 16. The bushings may be made of acetal, but this is not critical.

Referring now to FIGS. 4 and 5, a centrifuge 42 includes a drive motor 44 for rotating a drive shaft 46. An upper bushing 10 and a lower bushing 12 are slip fit onto the drive shaft 46. While not shown, set screws extend through a hub 48 to contact the lower bushing 12 and receiver 16, thereby fixing the lower bushing to the hub while allowing relative motion to the drive shaft. A rotor 50 is shown as having compartments for securing at least two specimen containers 52 and 54 for the centrifugal separation of specimen components. The containers 52 and 54 are placed in the rotor by removing a rotor lid 56. A bolt 58 extends through a hole in the rotor lid and is received within an internally threaded bore in the hub 48. The bolt secures the rotor lid to the rotor and secures the rotor to the hub.

The hub 48 has a cylindrical, downwardly depending skirt 60. The hub is at a fixed distance relative to the drive shaft 46 such that the cylindrical skirt is coaxial to the drive shaft. The rotational drive of the motor 44 is transferred to the rotor by means of the drive shaft 46, the impeller 14, the elastomers 30 and 38, the receiver 16, the hub 48 and a tang 61 that is received into the rotor. That is, the assembly of FIG. 2d achieves torque transmission from the drive shaft, which is in fixed relationship with the inside diameter of the impeller, to the hub, which is in fixed relationship with the outside diameter of the receiver.

The rotor 50, the hub 48 and the upper portion of the drive shaft 46 are contained within a chamber defined by a housing 62 having a cover 64, shown in FIG. 4. The interface of the cover 64 with the remainder of the housing typically includes vacuum seals. The side walls and the bottom wall of the housing may be a metallic framework having refrigeration coils at exterior surfaces to control the temperature within the enclosed chamber defined by the housing.

In addition to temperature control, the atmosphere within the enclosed chamber of the housing 62 may be controlled by operation of a vacuum pump 66. A conduit 68 connects to a fitting 70 that extends from the vacuum pump. At the opposite end of the conduit, the conduit is friction fit to a fitting 72 of a sleeve 74. The sleeve 74 has a lower, large diameter portion that extends coaxially with the drive shaft 46 to penetrate openings in an outer framework 76 and a bottom wall 78 of the housing 62. A vacuum seal 80 connects the bottom wall to the sleeve 74 to prevent leakage of air into the enclosed chamber of housing 62 after the evacuation of air from the housing.

A reduced diameter portion 82 of the sleeve 74 extends into the downwardly depending skirt 60 of the hub 48. The inside diameter of the sleeve is greater than the outside diameter of the drive shaft 46. As best seen in FIG. 5, a first annular gap 84 is formed between the drive shaft 46 and the inner surface of the sleeve. In turn, the outside diameter of the sleeve at the portion 82 that extends into the hub skirt 60 is less than the inside diameter of the skirt, providing a second annular gap 86. In FIGS. 4 and 5, the upper extent of the sleeve 74 is spaced apart from the hub 48. The region of the first annular gap 84 surrounded by the upper extent of the sleeve 74 is referred to herein as the "evacuation port." However, other embodiments of evacuation ports are contemplated. For example, one or more bores can be formed along the circumference of a sleeve that is sealed at its upper end. Gas flow from the enclosed chamber of the housing 62 to the vacuum pump 66 is upward with approach to the evacuation port and is downward with departure from the evacuation port.

The sleeve 74 extends downwardly in spaced relationship with the drive shaft 46 to the drive motor 44. Thus, the vacuum pump 66 is in fluid communication with the motor assembly, as well as the chamber of the housing 62.

Because access to the evacuation port defined by the sleeve 74 requires upward passage through the second annular gap 86, sample spillage and other foreign matter will not be gravitationally fed into the evacuation port. Operation of the centrifuge 42 further acts to prevent the passage of foreign matter into the vacuum pump 66. To enter the pump, material on the walls of the housing 62 would be required to move toward the center of the chamber. Such movement would be in a direction against the radial flow created by the spinning rotor. In this manner, operation of the rotor protects the evacuation port from the entrance of material which could threaten the motor 44 and the vacuum pump 66.

Referring now to FIGS. 1–5, operation of the centrifuge 42 will be accompanied by both lateral vibrations and torsional vibrations. Conventionally, lateral vibrations are controlled by including a drive mount for connecting the motor 44 to the outer framework 76. This foundation system provides vibration isolation. The resulting foundation flexibility and damping increases the critical speed of the centrifuge, thereby increasing the whirl threshold speed.

In operation of the present invention, torsional vibration is suppressed by the drive shaft-to-hub coupling assembly. Torsional damping is achieved without being accompanied by a significant degree of lateral damping of torsional vibrations. The selective damping is desirable, since any effect that the shaft-to-hub coupling may have on lateral damping must be accompanied by adjustments to the lateral damping at the foundation system. That is, since the desired lateral damping is obtained by designing the foundation system and the rotary system such that a ratio of foundation system damping to rotary system damping is achieved, any changes to the rotary system damping of lateral vibrations must be offset by adjustments to the foundation system.

Lateral damping at the shaft-to-hub coupling assembly is minimized by including the rigid annular bushings 10 and 12. While the elastomers 24–38 are compressible in the torsional direction relative to the axis of the drive shaft 46, the bushings 10 and 12 prevent such radial compression. The bushings are on opposite sides of the assembly of FIG. 2d, so that the receiver 16 remains axially aligned with the impeller 14 during operation of the centrifuge. In some embodiments, a single bushing may be utilized to provide the desired lateral stiffness.

Torsional vibrations are damped by compression and decompression of the elastomers 24–38 as the impeller 14 is caused to rotate relative to the receiver 16. The relative rotation causes one elastomer within an elastomer pair defined by the teeth 20 of the impeller to be compressed, while the other elastomer in the pair is subjected to a decreasing compressive force. If the relative rotation is then shifted in the opposite direction, the second elastomer in the pair is subjected to an increasing compressive force, while the previously compressed elastomer decompresses. Consequently, the transmission of torsional vibrations to the rotor 50 is damped.

By providing selective damping of torsional vibrations using the assembly shown in FIG. 2d, the torsional resonance stresses in a drive shaft can be reduced without adversely affecting the lateral damping. The bushings 10 and 12 prevent axial misalignment of the impeller 14 with the receiver 16, but are connected to permit relative rotation between the impeller and the receiver. As previously noted, the bushings are slip fit onto the drive shaft 46.

The preferred embodiment of the shaft-to-hub coupling assembly has been described above. However, other embodiments are possible. For example, the cylindrical elastomers 24–38 may be replaced by elastomers having a different configuration. The cylindrical elastomers provide some advantages, but the selective damping may be achieved using other shapes. The configurations of the impeller 14 and the receiver 16 are not critical. Other configurations in which elastomers are captured between structure affixed for rotation with the drive shaft 46 and structure affixed for rotation with the hub 48 may be provided. For example, the coupling assembly may be reduced to a bushing 10 and the elastomers 24–38, with the impeller teeth 20 being formed directly on the drive shaft and the receiver teeth 40 being formed directly on the hub. However, such a structure would add manufacturing complexity. In another alternative embodiment, the elastomers 24–38 may be replaced with an elastomeric ring for selectively damping vibrations.

I claim:

1. A centrifuge comprising:

a drive shaft;

a rotor;

a hub configured to receive said rotor for rotation of said rotor about an axis defined by said drive shaft, said rotor being fixed to said hub;

a mounting assembly for transmitting torque from said drive shaft to said hub, said mounting assembly including an elastomeric means for damping torsional vibrations of said hub, said elastomeric means being positioned to resiliently couple said hub to said drive shaft; and a rigid member connecting said drive shaft and said hub such that said hub is maintained at a fixed distance from said drive shaft, said rigid member being mounted to allow relative rotation between said hub and said drive shaft.

2. The centrifuge of claim 1 wherein said assembly for transmitting torque includes a first means for mounting said elastomeric means in generally fixed, spaced relation to said drive shaft and further includes a second means for mounting said elastomeric means in generally fixed, spaced relation to said hub.

3. The centrifuge of claim 2 wherein said first means is fixed to said drive shaft and said second means is fixed to said hub, said elastomeric means spacing apart said second means from said first means, said elastomeric means being resiliently deformable so that relative rotation between said drive shaft and said hub is limited to deformation of said elastomeric means.

4. The centrifuge of claim 1 wherein said elastomeric means is a plurality of elastomeric members arranged axially between said drive shaft and said hub.

5. The centrifuge of claim 4 wherein each elastomeric member is cylindrical and has an axis that is generally parallel to said axis defined by said drive shaft.

6. The centrifuge of claim 1 wherein said rigid member is a first annular bushing, said bushing having an inner bearing surface in contact with said drive shaft and having an outer bearing surface in contact with said hub.

7. The centrifuge of claim 6 further comprising a second annular bushing disposed to sandwich said mounting assembly between said first and second annular bushings.

8. The centrifuge of claim 1 further comprising a drive motor connected to said drive shaft for rotating said drive shaft.

9. An assembly for connecting a drive shaft of a centrifuge to a hub comprising:

a rigid annular bushing having an inside diameter in contact with said drive shaft and having an outside diameter in contact with said hub, said annular bushing connected to permit rotation of said hub relative to said drive shaft while maintaining said hub in coaxial alignment with said drive shaft;

a deformable means and first means for supporting said deformable means, said first means being fixed to said drive shaft for rotation therewith and being proximate to said annular bushing;

said deformable means being for deforming in a manner to provide limited rotational motion of said hub relative to said drive shaft, said deformable means being spaced apart from said drive shaft by said first means; and second means for supporting said deformable means, said second means being fixed to said hub for rotation therewith, said deformable means being secured between said first means and said second means, wherein torsional vibration of said hub is damped by said deformable means while said annular bushing limits damping of lateral vibrations.

10. The assembly of claim 9 wherein said deformable means is a plurality of elastomers arranged between said first means and said second means.

11. The assembly of claim 10 wherein said elastomers are cylindrical members, each having an axis parallel to an axis of said drive shaft.

12. The assembly of claim 10 wherein said first means is a sleeve having an outer circumference and further having projections extending radially outwardly relative to said outer circumference, said plurality of elastomers being further arranged in pairs of elastomers, each projection being disposed to separate adjacent pairs of elastomers.

13. The assembly of claim 12 wherein said second means is a second sleeve having an inner circumference and further having second projections extending radially inwardly relative to said inner circumference, each second projection disposed to separate adjacent pairs of elastomers.

14. The assembly of claim 9 further comprising a second rigid annular bushing disposed on said drive shaft to sandwich said first means between said rigid annular bushing and said second annular bushing.

15. An assembly for connecting a drive shaft of a centrifuge to a hub comprising:

a first sleeve fixed to said drive shaft for rotation therewith, said first sleeve having an outer surface and having first teeth extending radially outwardly therefrom;

a second sleeve fixed to said hub for rotation therewith, said second sleeve having an inner surface and having second teeth extending radially inwardly therefrom;

a plurality of elastomers positioned between said first and second sleeves, said first and second teeth combining to space apart adjacent elastomers, said first teeth being spaced apart from said second teeth by said elastomers;

means for maintaining said hub at a desired distance from said drive shaft, said means for maintaining being rotatable relative to said drive shaft, rotation of said hub relative to said drive shaft being limited to deformation of said elastomers; and drive means for rotating said drive shaft, said rotation being transmitted to said hub via said elastomers.

16. The assembly of claim 15 wherein said means for maintaining includes first and second annular rigid bushings on opposed sides of said first sleeve, said bushings being connected to said drive shaft to allow said drive shaft to rotate relative to said bushings.

17. The assembly of claim 15 wherein each of said elastomers is cylindrical.

18. A method of mounting a hub of a centrifuge to a drive shaft comprising the steps of:

elastomerically coupling said hub to said drive shaft such that torsional vibrations of said hub relative to movement of said drive shaft are damped; and rigidly coupling said hub to said drive shaft to maintain said hub in rigid coaxial alignment with said drive shaft, said step of rigidly coupling said hub being carried out to allow rotation of said hub relative to said drive shaft, so that the damping of torsional vibrations provided by said step of elastomerically coupling said hub is unaffected by said step of rigidly coupling said hub.

* * * * *